United States Patent
Bell et al.

(10) Patent No.: US 12,249,721 B2
(45) Date of Patent: Mar. 11, 2025

(54) ADDITIVE APPLICATION OF MICROPOROUS LAYER ONTO GAS DIFFUSION LAYER

(71) Applicant: HYDROGENICS CORPORATION, Mississauga (CA)

(72) Inventors: Ellsworth William Bell, Etobioke (CA); Udit N. Shrivastava, East York (CA); Arvind V. Harinath, Oakville (CA)

(73) Assignee: HYDROGENICS CORPORATION, Mississauga (CA)

( * ) Notice: Subject to any disclaimer, the term of this patent is extended or adjusted under 35 U.S.C. 154(b) by 119 days.

(21) Appl. No.: 18/157,664

(22) Filed: Jan. 20, 2023

(65) Prior Publication Data
US 2023/0246201 A1    Aug. 3, 2023

Related U.S. Application Data

(60) Provisional application No. 63/304,986, filed on Jan. 31, 2022.

(51) Int. Cl.
*H01M 4/86*    (2006.01)
*H01M 4/88*    (2006.01)

(52) U.S. Cl.
CPC ....... *H01M 4/8626* (2013.01); *H01M 4/8657* (2013.01); *H01M 4/8807* (2013.01); *H01M 4/8853* (2013.01)

(58) Field of Classification Search
CPC ............. H01M 4/8626; H01M 4/8657; H01M 4/8807; H01M 4/8853; H01M 8/0234; H01M 8/0245; H01M 8/0247
See application file for complete search history.

(56) References Cited

U.S. PATENT DOCUMENTS

| | | |
|---|---|---|
| 9,397,347 B2 | 7/2016 | Sasaki et al. |
| 9,508,995 B2 | 11/2016 | Choi et al. |
| (Continued) | | |

FOREIGN PATENT DOCUMENTS

| | | |
|---|---|---|
| CN | 103413947 | 7/2015 |
| CN | 111146467 | * 5/2020 |
| (Continued) | | |

OTHER PUBLICATIONS

English translation of CN Publication 111146467, May 2020.*
English translation of JP Publication 2008-198567, Aug. 2008.*

*Primary Examiner* — Brittany L Raymond
(74) *Attorney, Agent, or Firm* — Barnes & Thornburg LLP

(57) ABSTRACT

A fuel cell including a catalyst layer configured to generate liquid water in response to a reactant being in contact therewith. The fuel cell includes a microporous layer having a first region with a first pore size and a second region disposed adjacent to the first region having a second pore size. The first pore size being greater than the second pore size. The microporous layer being configured to transfer the liquid water away from the catalyst layer, such that the liquid water from the catalyst layer enters the first region in response to a capillary pressure of the liquid water being greater than a first capillary pressure. The liquid water enters the second region in response to a capillary pressure of the liquid water being greater than a second capillary pressure. The first capillary pressure being different from the second capillary pressure.

20 Claims, 7 Drawing Sheets

(56) References Cited

U.S. PATENT DOCUMENTS

| | | |
|---|---|---|
| 9,525,187 B2 | 12/2016 | Tsubosaka |
| 9,698,431 B2 | 7/2017 | Mitchell et al. |
| 2012/0122011 A1 | 5/2012 | Zou et al. |
| 2014/0051013 A1* | 2/2014 | Elabd .................. D01D 5/0061 427/77 |
| 2018/0269491 A1 | 9/2018 | Cho |
| 2019/0036129 A1 | 1/2019 | Sulek et al. |
| 2020/0119381 A1 | 4/2020 | Park et al. |
| 2020/0127306 A1* | 4/2020 | Park .................... H01M 4/8605 |
| 2022/0393184 A1* | 12/2022 | Bock .................. H01M 8/0245 |

FOREIGN PATENT DOCUMENTS

| | | | |
|---|---|---|---|
| EP | 1813701 | | 8/2007 |
| JP | 2008-198567 | * | 8/2008 |
| WO | 2011149732 | | 12/2011 |
| WO | 2015124251 | | 8/2015 |
| WO | 2020096086 | | 5/2020 |
| WO | 2020165074 | | 8/2020 |
| WO | WO 2021-099129 | * | 5/2021 |

* cited by examiner

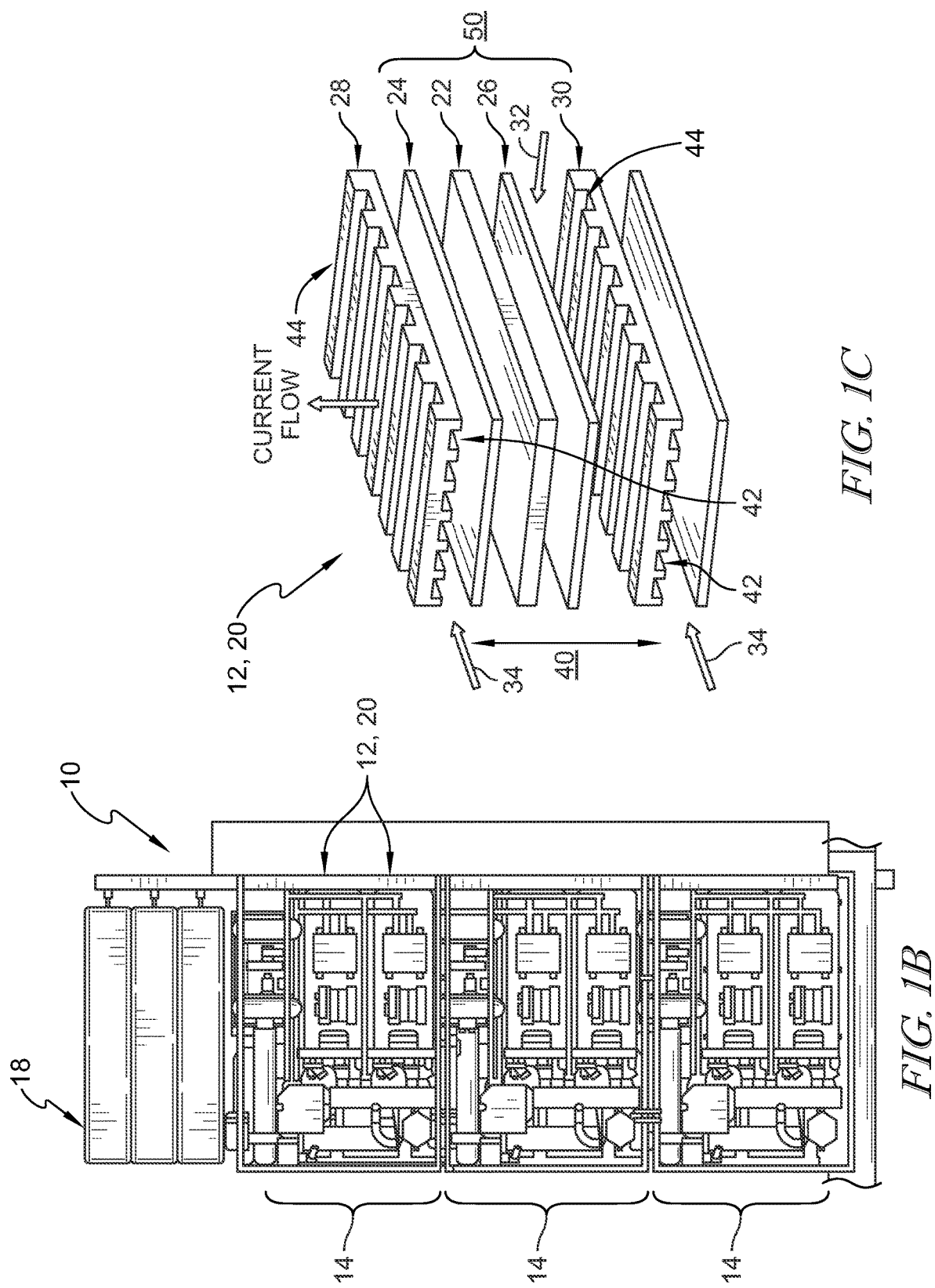

ADDITIVE APPLICATION OF MICROPOROUS LAYER ONTO GAS DIFFUSION LAYER

CROSS-REFERENCE TO RELATED APPLICATIONS

This non-provisional application claims the benefit and priority, under 35 U.S.C. § 119(e) and any other applicable laws or statutes, to U.S. Provisional Patent Application Ser. No. 63/304,986 filed Jan. 31, 2022, the entire disclosure of which is hereby expressly incorporated herein by reference.

TECHNICAL FIELD

The present disclosure generally relates to systems and methods for improved fuel cell layer design.

BACKGROUND

Fuel cell systems are known for their efficient use of fuel to develop direct current (DC) electric power. A fuel cell produces electricity by electrochemically combining a fuel and an oxidant across an ionic conducting layer, the electrolyte, for which many fuel cells are named. Individual fuel cells may be interconnected in series or in parallel and assembled to form a fuel cell stack configured to produce electrical power to support a specific application.

The electrode of a fuel cell may include a catalyst layer, a microporous layer, and a gas diffusion layer. Under certain operating conditions, liquid water present in the catalyst layer of the fuel cell electrode may cause flooding wherein excess water inhibits reactant (e.g., oxygen) diffusion from the gas diffusion layer to catalyst surfaces in the catalyst layer. The microporous layer may be deposited between the gas diffusion layer to separate the catalyst layer from the gas diffusion layer. The microporous layer selectively removes water away from the catalyst layer. The microporous layer also allows for the flow of gases (e.g., oxygen) from the gas diffusion layer into the catalyst layer.

The present disclosure is directed to products and methods for coating a gas diffusion layer of a fuel cell with a microporous layer to generate a unique structure having predefined characteristics to allow for more efficient transfer of reactant gases to reach a catalyst layer and to control water accumulation.

SUMMARY

Embodiments of the present invention are included to meet these and other needs.

In one aspect, described herein, a system for a fuel cell comprises a catalyst layer and a microporous layer. The catalyst layer is configured to generate liquid water in response to a reactant being in contact therewith. The microporous layer includes a first region having a first pore size and a second region disposed adjacent to the first region and having a second pore size. The first pore size is greater than the second pore size. The microporous layer is configured to transfer the liquid water away from the catalyst layer, such that the liquid water from the catalyst layer enters the first region of the microporous layer in response to a capillary pressure of the liquid water being greater than a first capillary pressure of the first region of the microporous layer, and the liquid water enters the second region of the microporous layer in response to a capillary pressure of the liquid water being greater than a second capillary pressure of the second region of the microporous layer. The first capillary pressure is different from the second capillary pressure.

In some embodiments, the second capillary pressure may be greater than the first capillary pressure, and the second region may be configured to slow transfer of liquid water away from the catalyst layer. In some embodiments, the fuel cell may further comprise a gas diffusion layer, wherein the first region and the second region of the microporous layer may be coated onto and integrated with a surface of the gas diffusion layer.

In some embodiments, at least one of the first region and the second region of the microporous layer may be coated onto the gas diffusion layer using an electrospinning process. In some embodiments, an electrospinning solution of the electrospinning process may be comprised of a solvent comprising about 90 wt % dimethylformamide (DMF) and a polymer comprising about 10 wt % polyacrylonitrile (PAN).

In some embodiments, at least one of the first region and the second region of the microporous layer may be coated onto the gas diffusion layer using an electrospraying process. In some embodiments, an electrospraying solution of the electrospraying process may comprise a solvent comprising water and alcohol in a one-to-one ratio, a solid material that ranges from about 2 wt % to about 5 wt %, or a binding agent that ranges from about 5 wt % to about 50 wt % of the solid material.

In some embodiments, the binding agent may comprise a polymer or an ionomer. In some embodiments, at least one of the first region and the second region may be coated onto the gas diffusion layer by an electrospraying device, wherein the electrospraying device may include a pump and at least one needle, and wherein the pump may flow the electrospraying solution through the at least one needle at a flow rate ranging from about 0.2 ml/hr to about 0.4 ml/hr.

In some embodiments, the liquid water may exit the microporous layer and enter the gas diffusion layer in response to a capillary pressure of the liquid water being greater than a third capillary pressure, wherein the third capillary pressure may be greater than the second capillary pressure. In some embodiments, a thickness of the microporous layer may be about 0.5 microns to about 40 microns.

According to a second aspect, described herein, a method for manufacturing a fuel cell comprises applying, using electrospinning, at least a portion of a microporous layer of the fuel cell onto a gas diffusion layer of the fuel cell to create electrospun fibers; and applying, using electrospraying, at least a portion of the microporous layer onto the gas diffusion layer, such that the resulting microporous layer includes a gradient capillary pressure including a plurality of capillary pressures and is configured to transfer liquid water away from a catalyst layer of the fuel cell toward the gas diffusion layer using the plurality of capillary pressures, wherein the liquid water from the catalyst layer enters the microporous layer in response to capillary pressure of the liquid water being greater than a first capillary pressure of the plurality of capillary pressures of the microporous layer, and the liquid water continues to be absorbed deeper into the microporous layer in response to the capillary pressure of the liquid water being greater than a second capillary pressure of the plurality of capillary pressures of the microporous layer, wherein the second capillary pressure is greater than the first capillary pressure.

In some embodiments, the method may further comprise carbonizing the electrospun fibers applied to the gas diffusion layer to remove solvents from the gas diffusion layer, wherein the carbonizing may include heating the electrospun fibers for a predefined period of time. In some embodiments, the method may further comprise sintering a binder agent applied to the gas diffusion layer during the electrospraying. In some embodiments, the binding agent comprises a polymer or an ionomer.

According to a third aspect of the present disclosure, described herein, a fuel cell comprises a catalyst layer, a gas diffusion layer, and a microporous layer. The catalyst layer is configured to generate liquid water in response to a reactant being in contact with the catalyst layer. The gas diffusion layer is configured to receive the liquid water from the catalyst layer. The microporous layer is disposed between the catalyst layer and the gas diffusion layer. The microporous layer is configured to transfer the liquid water away from the catalyst layer and toward the gas diffusion layer. The microporous layer comprises a gradient capillary pressure including a plurality of capillary pressures. The microporous layer is configured to transfer the liquid water using the plurality of capillary pressures such that the liquid water from the catalyst layer enters the microporous layer in response to a capillary pressure of the liquid water being greater than a first capillary pressure of the plurality of capillary pressures of the microporous layer. The liquid water is configured to be absorbed by the microporous layer in response to the capillary pressure of the liquid water being greater than a second capillary pressure of the plurality of capillary pressures of the microporous layer. The first capillary pressure of the plurality of capillary pressures is less than the second capillary pressure of the plurality of capillary pressures.

In some embodiments, the liquid water may be configured to exit the microporous layer and to enter the gas diffusion layer in response to the capillary pressure of the liquid water being greater than a third capillary pressure of the gas diffusion layer, wherein the second capillary pressure may be less than the third capillary pressure. In some embodiments, the microporous layer may comprise at least two regions, and wherein each of the at least two regions may have a corresponding capillary pressure of the plurality of capillary pressures that is different from a capillary pressure of the other region of the at least two regions.

In some embodiments, the liquid water may be configured to enter a first region of the microporous layer in response to the capillary pressure of the liquid water being greater than the first capillary pressure of the first region, wherein the liquid water may be configured to enter a second region of the microporous layer in response to the capillary pressure of the liquid water being greater than the second capillary pressure of the second region, and wherein the liquid water may be configured exit the microporous layer and to enter the gas diffusion layer in response to the capillary pressure of the liquid water being greater than the third capillary pressure of the gas diffusion layer. In some embodiments, a first pore size of the first region of the microporous layer may be greater than a second pore size of the second region of the microporous layer.

BRIEF DESCRIPTION OF THE DRAWINGS

The detailed description particularly refers to the following figures, in which:

FIG. 1B is a cutaway view of an exemplary fuel cell system including an air delivery system, hydrogen delivery systems, and a plurality of fuel cell modules each including multiple fuel cell stacks;

FIG. 1C is a perspective view of an exemplary repeating unit of a fuel cell stack of the fuel cell system of FIG. 1A;

DETAILED DESCRIPTION

Figure 1A:
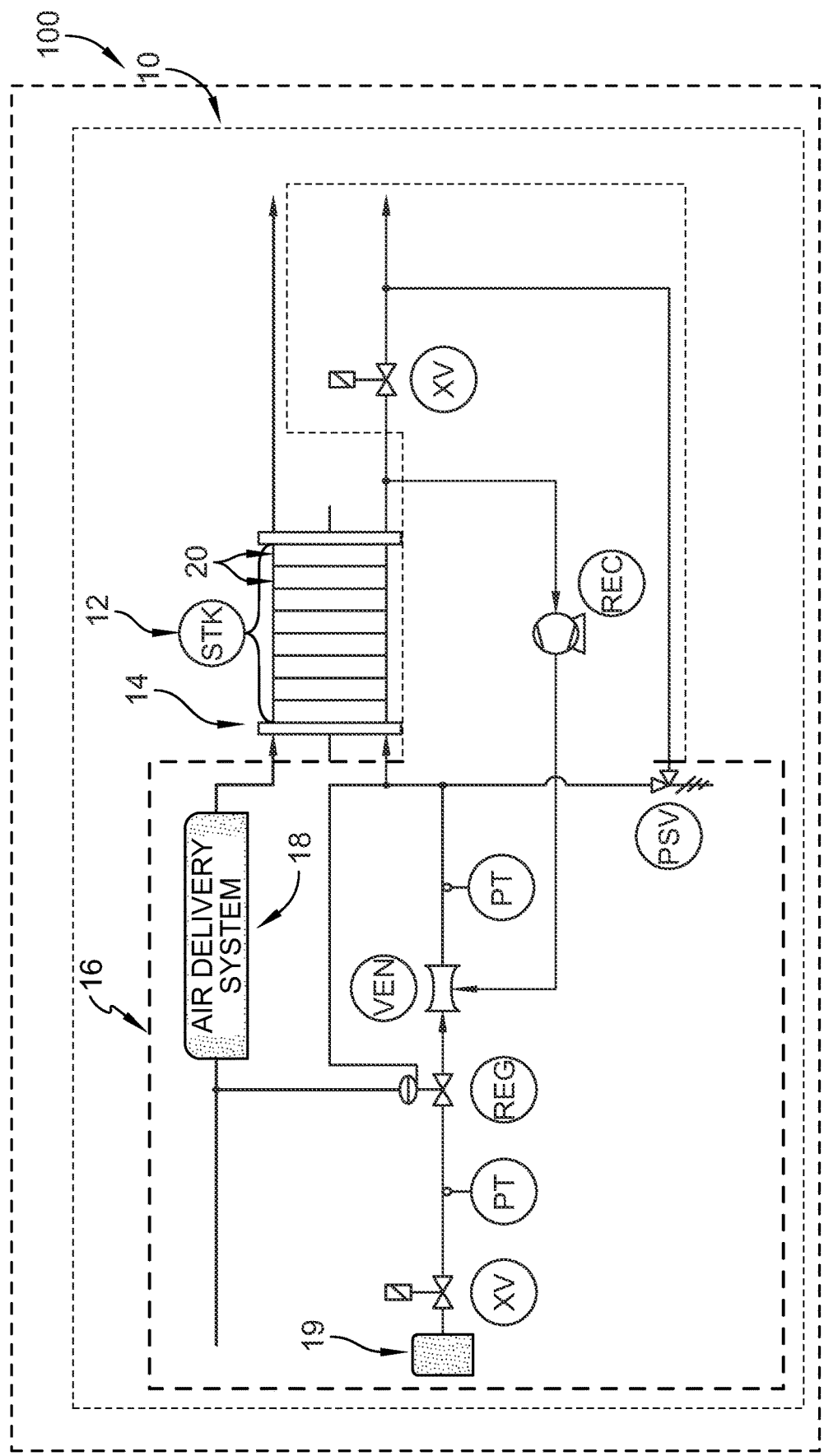
FIG. 1A is a schematic view of an exemplary fuel cell system including an air delivery system, a hydrogen delivery system, and a fuel cell module including a stack of multiple fuel cells.

As shown in FIG. 1A, fuel cell systems 10 often include one or more fuel cell stacks 12 or fuel cell modules 14 connected to a balance of plant (BOP) 16, including various components, to support the electrochemical conversion, generation, and/or distribution of electrical power to help meet modern day industrial and commercial needs in an environmentally friendly way. As shown in FIGS. 1B and 1C, fuel cell systems 10 may include fuel cell stacks 12 comprising a plurality of individual fuel cells 20. Each fuel cell stack 12 may house a plurality of fuel cells 20 assembled together in series and/or in parallel. The fuel cell system 10 may include one or more fuel cell modules 14 as shown in FIGS. 1A and 1B.

Each fuel cell module 14 may include a plurality of fuel cell stacks 12 and/or a plurality of fuel cells 20. The fuel cell module 14 may also include a suitable combination of associated structural elements, mechanical systems, hardware, firmware, and/or software that is employed to support the function and operation of the fuel cell module 14. Such items include, without limitation, piping, sensors, regulators, current collectors, seals, and insulators.

The fuel cells 20 in the fuel cell stacks 12 may be stacked together to multiply and increase the voltage output of a single fuel cell stack 12. The number of fuel cell stacks 12 in a fuel cell system 10 can vary depending on the amount of power required to operate the fuel cell system 10 and meet the power need of any load. The number of fuel cells 20 in a fuel cell stack 12 can vary depending on the amount of power required to operate the fuel cell system 10 including the fuel cell stacks 12.

The number of fuel cells 20 in each fuel cell stack 12 or fuel cell system 10 can be any number. For example, the number of fuel cells 20 in each fuel cell stack 12 may range from about 100 fuel cells to about 1000 fuel cells, including any specific number or range of number of fuel cells 20 comprised therein (e.g., about 200 to about 800). In an embodiment, the fuel cell system 10 may include about 20 to about 1000 fuel cells stacks 12, including any specific number or range of number of fuel cell stacks 12 comprised therein (e.g., about 200 to about 800). The fuel cells 20 in the fuel cell stacks 12 within the fuel cell module 14 may be oriented in any direction to optimize the operational efficiency and functionality of the fuel cell system 10.

The fuel cells 20 in the fuel cell stacks 12 may be any type of fuel cell 20. The fuel cell 20 may be a polymer electrolyte membrane or proton exchange membrane (PEM) fuel cell, an anion exchange membrane fuel cell (AEMFC), an alkaline fuel cell (AFC), a molten carbonate fuel cell (MCFC), a direct methanol fuel cell (DMFC), a regenerative fuel cell (RFC), a phosphoric acid fuel cell (PAFC), or a solid oxide fuel cell (SOFC). In an exemplary embodiment, the fuel cells 20 may be a polymer electrolyte membrane or proton exchange membrane (PEM) fuel cell or a solid oxide fuel cell (SOFC).

In an embodiment shown in FIG. 1C, the fuel cell stack 12 includes a plurality of proton exchange membrane (PEM) fuel cells 20. Each fuel cell 20 includes a single membrane electrode assembly (MEA or a membrane) 22 and gas diffusion layers (GDL) 24, 26 on either or both sides of the membrane electrode assembly (MEA) 22 (see FIG. 1C). The fuel cell 20 further includes a bipolar plate (BPP) 28, 30 on the external side of each gas diffusion layers (GDL) 24, 26, as shown in FIG. 1C. The above-mentioned components, in particular the bipolar plate 30, the gas diffusion layer (GDL) 26, the membrane electrode assembly (MEA) 22, and the gas diffusion layer (GDL) 24 comprise a single repeating unit 50.

The bipolar plates (BPP) 28, 30 are responsible for the transport of reactants, such as fuel 32 (e.g., hydrogen) or oxidant 34 (e.g., oxygen, air), and cooling fluid 36 (e.g., coolant and/or water) in a fuel cell 20. The bipolar plates (BPP) 28, 30 can uniformly distribute reactants 32, 34 to an active area 40 of each fuel cell 20 through oxidant flow fields 42 and/or fuel flow fields 44 formed on outer surfaces of the bipolar plates (BPP) 28, 30. The active area 40, where the electrochemical reactions occur to generate electrical power produced by the fuel cell 20, is centered, when viewing the stack 12 from a top-down perspective, within the membrane electrode assembly (MEA) 22, the gas diffusion layers (GDL) 24, 26, and the bipolar plate (BPP) 28, 30.

Figure 1D:
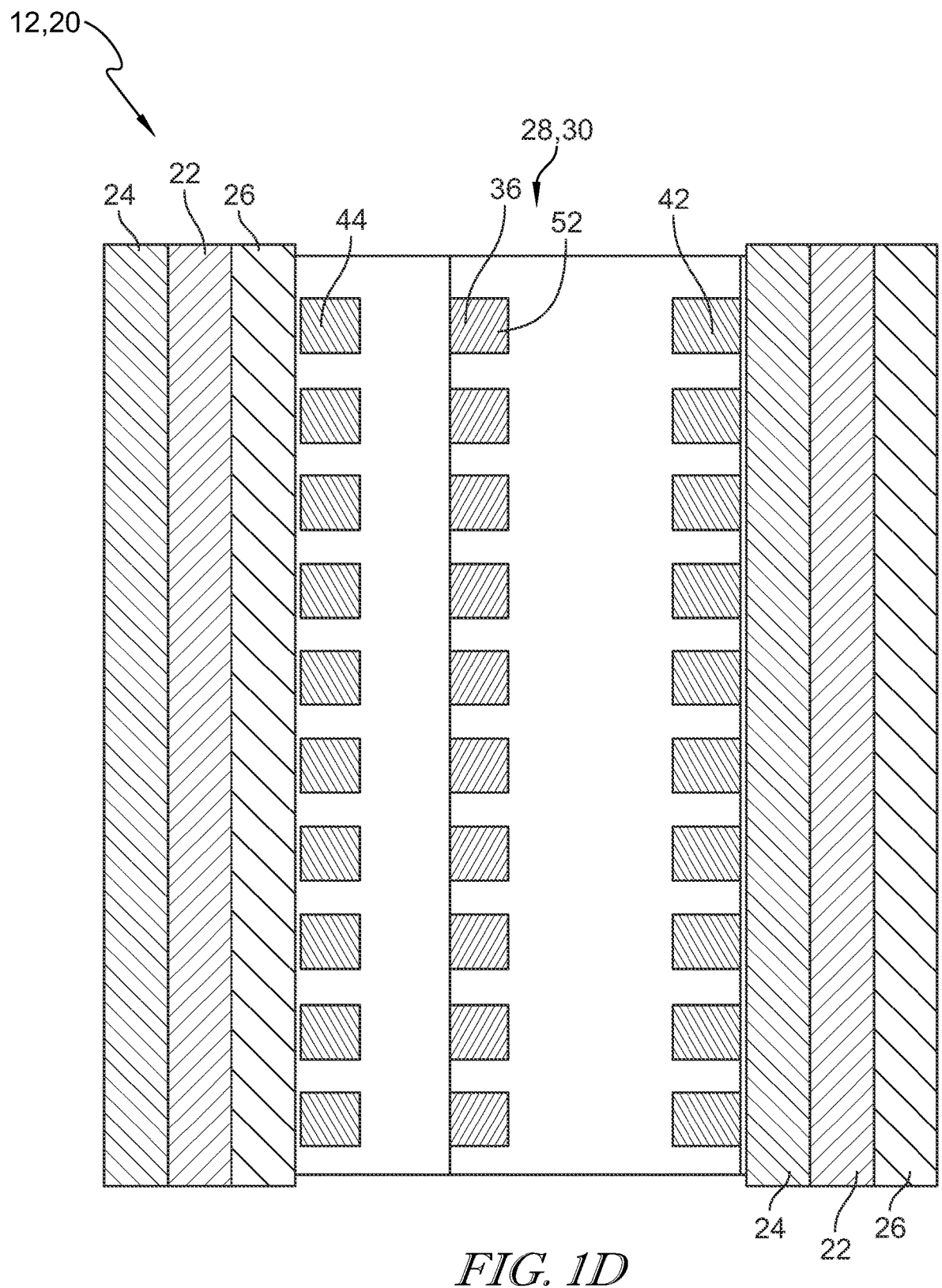
FIG. 1D is a cross-sectional view of an exemplary repeating unit of the fuel cell stack of FIG. 1C.

The bipolar plates (BPP) 28, 30 may each be formed to have reactant flow fields 42, 44 formed on opposing outer surfaces of the bipolar plate (BPP) 28, 30, and formed to have coolant flow fields 52 located within the bipolar plate (BPP) 28, 30, as shown in FIG. 1D. For example, the bipolar plate (BPP) 28, 30 can include fuel flow fields 44 for transfer of fuel 32 on one side of the plate 28, 30 for interaction with the gas diffusion layer (GDL) 26, and oxidant flow fields 42 for transfer of oxidant 34 on the second, opposite side of the plate 28, 30 for interaction with the gas diffusion layer (GDL) 24. As shown in FIG. 1D, the bipolar plates (BPP) 28, 30 can further include coolant flow fields 52 formed within the plate (BPP) 28, 30, generally centrally between the opposing outer surfaces of the plate (BPP) 28, 30. The coolant flow fields 52 facilitate the flow of cooling fluid 36 through the bipolar plate (BPP) 28, 30 in order to regulate the temperature of the plate (BPP) 28, 30 materials and the reactants. The bipolar plates (BPP) 28, 30 are compressed against adjacent gas diffusion layers (GDL) 24, 26 to isolate and/or seal one or more reactants 32, 34 within their respective pathways 44, 42 to maintain electrical conductivity, which is required for robust operation of the fuel cell 20 (see FIGS. 1C and 1D).

The fuel cell system 10 described herein, may be used in stationary and/or immovable power system, such as industrial applications and power generation plants. The fuel cell system 10 may also be implemented in conjunction with an air delivery system 18. Additionally, the fuel cell system 10 may also be implemented in conjunction with a hydrogen delivery system and/or a source of hydrogen 19 such as a pressurized tank, including a gaseous pressurized tank, cryogenic liquid storage tank, chemical storage, physical storage, stationary storage, an electrolysis system or an electrolyzer. In one embodiment, the fuel cell system 10 is connected and/or attached in series or parallel to a hydrogen delivery system and/or a source of hydrogen 19, such as one or more hydrogen delivery systems and/or sources of hydrogen 19 in the BOP 16 (see FIG. 1A). In another embodiment, the fuel cell system 10 is not connected and/or attached in series or parallel to a hydrogen delivery system and/or a source of hydrogen 19.

The present fuel cell system 10 may also be comprised in mobile applications. In an exemplary embodiment, the fuel cell system 10 is in a vehicle and/or a powertrain 100. A vehicle 100 comprising the present fuel cell system 10 may be an automobile, a pass car, a bus, a truck, a train, a locomotive, an aircraft, a light duty vehicle, a medium duty vehicle, or a heavy-duty vehicle. Type of vehicles 100 can also include, but are not limited to commercial vehicles and engines, trains, trolleys, trams, planes, buses, ships, boats, and other known vehicles, as well as other machinery and/or manufacturing devices, equipment, installations, among others.

The vehicle and/or a powertrain 100 may be used on roadways, highways, railways, airways, and/or waterways. The vehicle 100 may be used in applications including but not limited to off highway transit, bobtails, and/or mining equipment. For example, an exemplary embodiment of mining equipment vehicle 100 is a mining truck or a mine haul truck.

In addition, it may be appreciated by a person of ordinary skill in the art that the fuel cell system 10, fuel cell stack 12, and/or fuel cell 20 described in the present disclosure may be substituted for any electrochemical system, such as an electrolysis system (e.g., an electrolyzer), an electrolyzer stack, and/or an electrolyzer cell (EC), respectively. As such, in some embodiments, the features and aspects described and taught in the present disclosure regarding the fuel cell system 10, stack 12, or cell 20 also relate to an electrolyzer, an electrolyzer stack, and/or an electrolyzer cell (EC). In further embodiments, the features and aspects described or taught in the present disclosure do not relate, and are therefore distinguishable from, those of an electrolyzer, an electrolyzer stack, and/or an electrolyzer cell (EC).

Figure 2A:
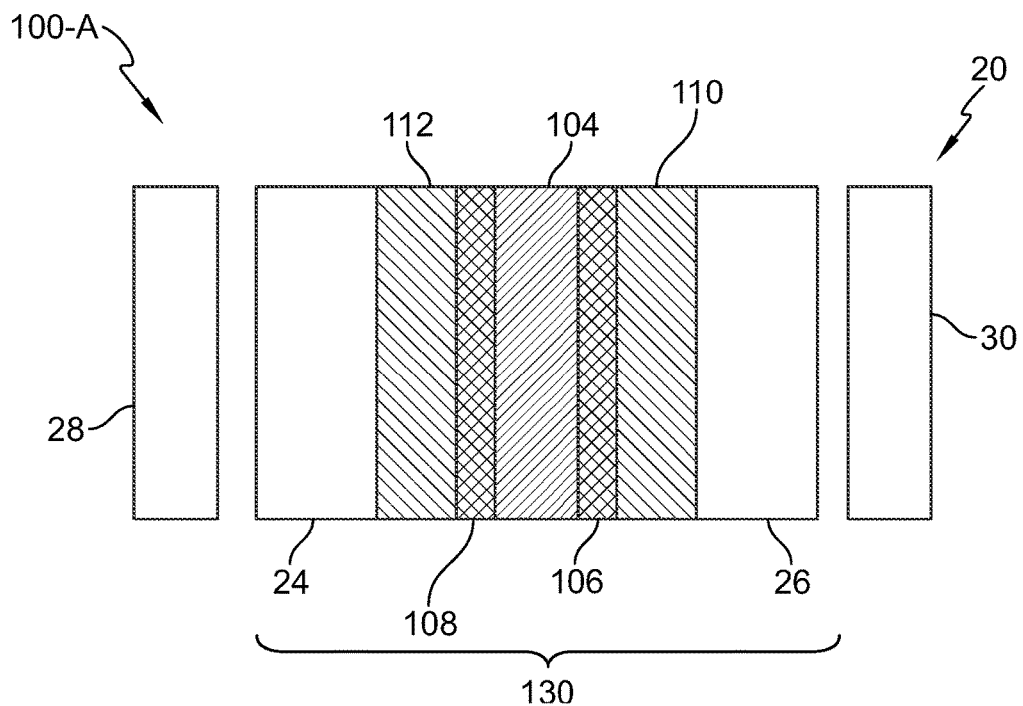
FIG. 2A is a schematic view illustrating an example implementation of a fuel cell having a plurality of layers.

FIG. 2A illustrates an example implementation 100-A of fuel cell 20 in accordance with the present disclosure. In an example, a plurality of fuel cells 20 may be combined within fuel cell stack 12, as described, for example, in reference to FIG. 2B. The fuel cell 20 includes a plurality of layers 130 disposed between bipolar plate (BPP) 30, also known as a cathode plate 30, and bipolar plate (BPP) 28, also known as an anode plate 28. The plurality of layers 130 of the fuel cell 20 include the single membrane electrode assembly (MEA) 22 and gas diffusion layers (GDL) 24, 26. The single membrane electrode assembly (MEA) 22 includes first and second catalyst layers 106, 108, first and second microporous layers 110, 112, and a membrane 104. The MEA 22 (which is typically regarded as a five-layer assembly) and the gas diffusion layers 24, 26 together form the plurality of layers 130, also known as a diffusion-electrode assembly 130.

In one example of the diffusion-electrode assembly 130, the first catalyst layer 106 and the second catalyst layer 108 are disposed on opposite sides of, and adjacent to, the membrane 104. The first microporous layer 110 is disposed between the first catalyst layer 106 and the first gas diffusion layer 26 on the cathode 30 side of the fuel cell 20. On the anode 28 side of the fuel cell 20, the second microporous layer 112 is disposed between the second catalyst layer 108 and the second gas diffusion layer 24.

In response to being exposed to a flow of fuel 32, e.g., hydrogen, the diffusion-electrode assembly 130 is configured to initiate, carry out, or undergo the electrochemical reaction to generate electric energy and any byproducts, such as exhaust gases, water, and so on. The gas diffusion layers 24, 26 are configured to condition a flow of air 34 or fuel 32 through oxidant flow fields 42 and fuel flow fields 44 of the cathode and anode plates 30, 28, respectively, to permit the air 34 or fuel 32 to interface with surfaces of the catalyst layers 106, 108 to initiate the electrochemical reaction. The gas diffusion layer 26 of the cathode 30 side facilitates removal of water generated as a byproduct of the reaction. The gas diffusion layer 24 of the anode 28 side facilitates removal of water generated as a byproduct of the reaction as well. The microporous layers 110, 112 may be coated (or otherwise applied) onto an inner surface of the gas diffusion layers 24, 26. The microporous layers 110, 112 are configured to provide controlled water retention to maintain conductivity of the membrane 104 and provide controlled release of the water to keep pores of the gas diffusion layers 24, 26 and microporous layers 110, 112 open to support diffusion of oxygen 34 and/or fuel 32 into the catalyst layers 106, 108.

Under certain operating conditions of the fuel cell 20, such as, during operation at high humidity and high current densities, liquid water accumulates in the catalyst layers 106, 108. This accumulation of water may affect performance of the fuel cell 20 by inhibiting reactant diffusion to the catalyst layers 106, 108 and may accelerate degradation of the catalyst support. However, removal of water from the membrane 104 and the catalyst layers 106, 108 may not be advantageous under dry conditions when water retention may be desirable. Disclosed systems and methods for application of the microporous layers 110, 112 onto the gas diffusion layers 24, 26 provide improved control of a structure of the microporous layers 110, 112 and/or the gas diffusion layers 24, 26.

While the fuel cell 20 described in reference to FIG. 2A is a PEM fuel cell 20, implementations of the microporous layer 110, 112 consistent with the present disclosure are not limited thereto. Among other examples, the microporous layer 110, 112 as described herein, may be applied within an anion exchange membrane (AEM) fuel cell. An AEM fuel cell may differ from the PEM fuel cell 20 based on corresponding materials used as ionomer and membrane 104 materials. More specifically, whereas PEM fuel cell membranes 104 are made of materials that facilitate exchange of cations, e.g., protons, between anode and cathode, AEM fuel cell membranes use materials that facilitate exchange of anions, e.g., hydroxide (OH—). A direction of flow of anions and water in the AEM fuel cell may be opposite to the direction of the transport in the PEM fuel cell 20, such that anions are generated during electrochemical oxygen reduction at the cathode and are transported from the cathode to the anode through the anion conducting polymer electrolyte. At the anode, the anions combine with hydrogen to generate water.

Figure 2B:
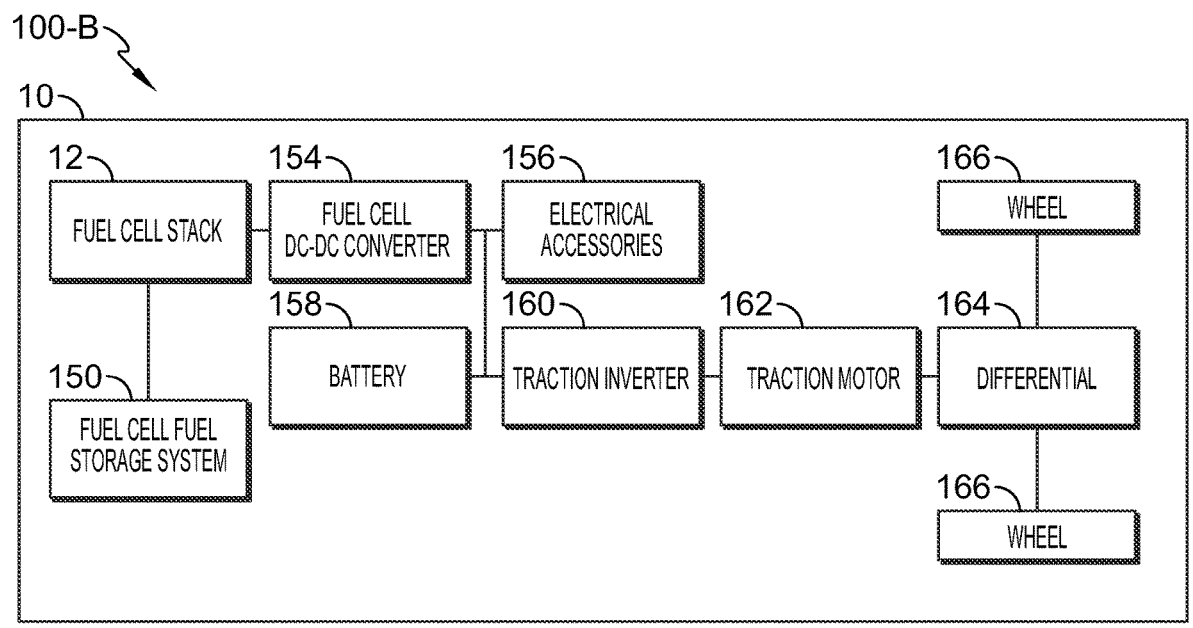
FIG. 2B is a block diagram illustrating a fuel cell vehicle including the fuel cell of FIG. 2A.

FIG. 2B illustrates an example implementation 100-B of a fuel cell system 10 in accordance with the present disclosure. While the fuel cell system 10 illustrated and described in reference to FIG. 2B is for vehicle applications, the microporous layer 110, 112 application systems and methods disclosed herein are not so limited.

Example applications of the systems and methods for applying of the fuel cell stack 12 in accordance with the present disclosure include, but are not limited to, stationary or semi-stationary applications in personal, residential, and/or industrial context. Example non-stationary applications of the humidification system and method of the present disclosure include vehicular and mobile applications, whether operator-controlled, autonomous, or semi-autonomous, such as, but are not limited to, automobiles, vans, trucks, agricultural machinery and equipment, trains, marine vehicles, aircraft, spacecraft, satellite, and drone. In an example, the fuel cell system 10 may be configured to include one or more fuel cells 20, such as the example fuel cell 20 described in reference to FIG. 2A.

Referring to FIG. 2B, the example fuel cell system 10 includes a fuel cell fuel storage system 150, a fuel cell stack 12, a battery 158, and/or a traction motor 162. The fuel cell fuel storage system 150 of the example fuel cell system 10 provides fuel cell fuel 32 (e.g., hydrogen, compressed natural gas (CNG)) to the fuel cell stack 12. The fuel cell stack 12 uses a chemical process to generate electrical energy. The electrical energy generated by the fuel cell stack 12 may be stored in the battery 158 for use by one or more propulsion or non-propulsion components of the example fuel cell system 10.

Further, at least a portion of the electrical energy generated by the fuel cell stack 12, whether directly or via the battery 158, may be used to power the traction motor 162. The traction motor 162 is mechanically coupled to a differential 164 that distributes power to one or more wheels 166 (e.g., about 1 to about 16 wheels) to operate the example fuel cell system 10. Still further, at least a portion of the electrical energy generated by the fuel cell stack 12, whether directly or via the battery 158, may be transferred to power electrical accessories 156 of the example fuel cell system 10, such as interior lighting, cabin cooling, and/or an infotainment system (e.g., TV/console/computer display system).

A fuel cell DC-DC converter 154 steps up DC power output by the fuel cell stack 12 to a voltage compatible with the electrical accessories 156 and/or the battery 158. A traction inverter 160 inverts DC power supplied by the battery 158 and/or by the fuel cell stack 12 to AC power compatible with the traction motor 162. The traction inverter 160 may be bi-directional and may convert AC power output by the traction motor 162 operating in a generator mode to DC power for transfer to the battery 158.

Figure 3:
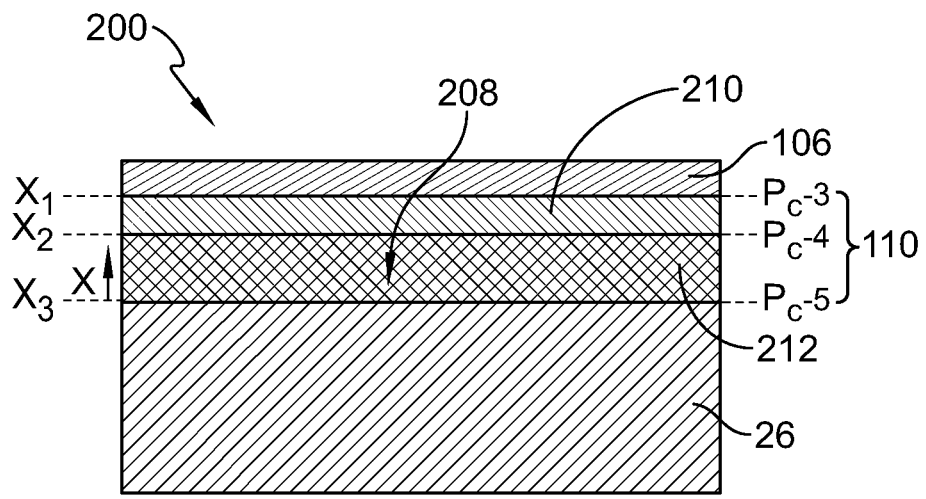
FIG. 3 is a schematic view illustrating an example implementation for applying a microporous layer onto a gas diffusion layer in accordance with the present disclosure.

FIG. 3 is a schematic illustrating an exemplary embodiment or implementation 200 of applying the microporous layer 110 onto the gas diffusion layer 26 in accordance with the present disclosure. This implementation 200 includes the catalyst layer 106, disposed atop or above the microporous layer 110 that is disposed atop or above the gas diffusion layer 26 on the cathode side 30 of the fuel cell stack 12. In an example, the microporous layer 110 is applied to and integrated with at least a portion of the gas diffusion layer 26.

As described, FIG. 3 illustrates an exemplary implementation 200 of applying the microporous layer 110 onto the gas diffusion layer 26 on the cathode side 30 of the fuel cell stack 12. However, the present disclosure also relates to applying the microporous layer 112 onto the gas diffusion layer 24 on the anode side 28 of the fuel cell stack 12. In such an embodiment, the catalyst layer 108 is disposed atop or above the microporous layer 112, which is disposed atop or above the gas diffusion layer 24, as suggested in FIG. 2A. Additionally, in this embodiment, the microporous layer 112 is applied to and integrated with at least a portion of the gas diffusion layer 24 on the anode side 28 of the fuel cell stack 12.

Referring back to FIG. 3, specifically, the present disclosure is directed to products and methods for coating the gas diffusion layer 24, 26 of the fuel cell 20 with the microporous layer 110, 112. The microporous layer 110, 112 being applied to the gas diffusion layer 24, 26 has one or more predefined physical properties, such as, but not limited to, a predefined size of pores 208. In an example, the fuel cell 20 includes the gas diffusion layer 24, 26 and the microporous layer 110, 112 applied (or coated) onto the gas diffusion layer 24, 26 using electrospinning or electrospraying processes 500-A, 500-B generating a unique structure having predefined characteristics, such as a predefined pore 208 size, to allow for more efficient transfer of reactant gases 34, 32 to reach the catalyst layer 106, 108 and to control water accumulation.

For simplicity, the methods for coating the gas diffusion layer 24, 26 of the fuel cell 20 with the microporous layer 110, 112 of the present disclosure will be discussed in relation to microporous layer 110, but the present systems, products, and/or methods apply similarly to the microporous layer 112. In particular, the microporous layer 110 may include a plurality of regions 210, 212. A first region 210 of the microporous layer 110 is disposed immediately adjacent to, and interfacing with, the catalyst layer 106. A second region 212 of the microporous layer 110 is disposed between the first region 210 of the microporous layer 110 and a remaining portion of the gas diffusion layer 26. In an example, the first region 210 and the second region 212 of the microporous layer 110 are coated onto and integrated with a surface of the gas diffusion layer 26.

As previously mentioned, the microporous layer 110 applied to the gas diffusion layer 26 may define the plurality of pores 208. The pores 208 may allow gases (e.g., oxygen 34 or hydrogen 32) or fluids (e.g., liquid water) or vapors (e.g., water vapor) to enter and move within the microporous layer 110. In an example, the pores 208 in the microporous layer 110 may be at least hydrophobic or hydrophilic. Hydrophobicity is indicative of an increased tendency to repel water and hydrophilicity is indicative of an increased tendency to attract water.

In some instances, one of the regions 210, 212 of the microporous layer 110 may be relatively more hydrophobic (less hydrophilic) than another one of the regions 210, 212 of the microporous layer 110. Physical properties of the regions 210, 212, such as levels of hydrophobicity and/or hydrophilicity, may be based on a size of the pores 208. The hydrophobicity or hydrophilicity may also be based on the surface energies of the pores 208 of each of the regions 210, 212 of the microporous layer 110.

A size or diameter of the pores 208 of the first region 210 may be greater than a size or diameter of the pores 208 of the second region 212, such that water entering or moving through the pores 208 of the first region 210 may enter and move through the second region 212 at a slower rate. In some embodiments, the size (e.g., diameter) of pores 208 in the microporous layer 110 may typically range from about 10 nanometers to about 1 micron, including any specific or range of size comprised therein. In some embodiments, the size of the pores 208 may be greater than 1 micron.

Capillary pressure parameter ($P_c$) describes relative forces acting within and between liquids and their bounding solids, such as cohesive forces, including surface and interfacial tension, adhesive forces, or liquid-solid forces. In an example, a liquid may be described as "wetting" in response to adhesive forces being greater than cohesive forces. The liquid may also be considered "nonwetting" in response to cohesive forces being greater than adhesive forces.

A contact angle θ may be an angle between a solid and a liquid-to-liquid interface and may describe a relative wettability of a liquid. Put another way, capillary pressure ($P_c$) is an amount of pressure necessary to force a nonwetting phase to displace a wetting phase in the capillary. Capillary pressure ($P_c$) may be determined using one of equation (1) and/or equation (2), as shown below.

$$P_c = (\rho_{nw} - \rho_w)gh \tag{1}$$

$$P_c = \frac{2\sigma\cos\theta}{r_c} \tag{2}$$

Variables of equations 1 and 2 are described herein. $\rho_w$ is indicative of density of a wetting fluid. $\rho_{nw}$ is indicative of density of a nonwetting fluid. g is indicative of gravitational constant. h is indicative of height above the free surface. σ is indicative of interfacial tension. θ is indicative of contact angle between the fluids and a capillary tube. $r_c$ is indicative of radius of the capillary.

The first region 210 may be associated with a first capillary pressure ($P_{C-3}$) and the second region 212 may be associated with a second capillary pressure ($P_{C-4}$) different from the first capillary pressure ($P_{C-3}$). In this manner, the microporous layer 110 applied to a surface of, and integrated with, at least a portion of the gas diffusion layer 26 includes a capillary pressure gradient between and/or comprising the first capillary pressure ($P_{C-3}$) and the second capillary pressure ($P_{C-4}$). In an example of the capillary pressure gradient, the first capillary pressure ($P_{C-3}$) of the first region 210 may be greater than the second capillary pressure ($P_{C-4}$) of the second region 212 of the microporous layer 110. In another example of the capillary pressure gradient, the first capillary pressure ($P_{C-3}$) of the first region 210 of the microporous layer 110 may be less than the second capillary pressure ($P_{C-4}$) of the second region 212 of the microporous layer 110.

In some instances, water may accumulate in the catalyst layer 106 until capillary pressure ($P_c$) of the liquid water becomes greater than a first capillary pressure ($P_{C-3}$) of the first region 210 as suggested in FIG. 3. In response to capillary pressure ($P_c$) of water at the catalyst layer 106 and microporous layer 110 interface being greater than the first capillary pressure ($P_{C-3}$) of the first region 210, liquid water may be forced through the first region 210, at position $x_1$, of the microporous layer 110 thereby removing liquid water away from the catalyst layer 106 by transporting away liquid water. In other words, while the capillary pressure ($P_c$) of the liquid water is less than the first capillary pressure ($P_{C-3}$) of the first layer 210, all water generated during fuel cell 20 operation remains in the catalyst layer 106 and the membrane 104. In response to the capillary pressure ($P_c$) of the liquid water being greater than or equal to the first capillary pressure ($P_{C-3}$) of the first region 210, water begins to invade the first region 210 of the microporous layer 110.

Water may accumulate in the first region 210 of the microporous layer 110, invading deeper into the microporous layer 110 until the capillary pressure ($P_c$) of the liquid water increases to the second capillary pressure ($P_{C-4}$) of the second region 212. The second capillary pressure ($P_{C-4}$) of the second region 212 is greater than the first capillary pressure ($P_{C-3}$) of the first region 210. In response to capillary pressure ($P_c$) of the liquid water being greater than the second capillary pressure ($P_{C-4}$) of the second region 212, the liquid water may enter the second region 212, at position $x_2$, of the microporous layer 110. The invasion of water into the second region 212 increases with an increase in capillary pressure ($P_c$) of the liquid water. Put another way, the second capillary pressure ($P_{C-4}$) may be said to be the "breakthrough" pressure of the first region 210 of the microporous layer 110, such that water may be forced entirely through the first region 210 of the microporous layer 110 in response to the capillary pressure ($P_c$) of the liquid water on the cathode side 30 of the fuel cell 20 being greater than or equal to the second capillary pressure ($P_{C-4}$).

Upon capillary pressure ($P_c$) of the liquid water being greater than or equal to a third capillary pressure ($P_{c-5}$), the liquid water may exit the second region 212 of the microporous layer 110 and enter the gas diffusion layer 26 (e.g., by crossing position $x_3$ from the microporous layer 110 into the gas diffusion layer 26), where the third capillary pressure ($P_{c-5}$) is greater than the second capillary pressure ($P_{c-4}$). The third capillary pressure ($P_{c-5}$) may be said to be the "breakthrough" pressure of the second region 212 and/or of the microporous layer 110 as a whole. In other words, the third capillary pressure ($P_{c-5}$) may be the capillary pressure ($P_c$) necessary to cause water to transfer (or transport) through the microporous layer 110 to an interface between the microporous layer 110 and the gas diffusion layer 26.

A corresponding capillary pressure ($P_{GDL}$) of the gas diffusion layer 26 may be less than the third capillary pressure ($P_{c-5}$), such that in response to the capillary pressure ($P_c$) of water on the cathode side 30 of the fuel cell 20 being greater than or equal to the third capillary pressure ($P_{c-5}$), water is forced completely through the microporous layer 110 and through the gas diffusion layer 26. Once forced completely through the gas diffusion layer 26, the water is carried through the flow fields 52 (along with the reactant gases) and out of the fuel cell 20.

Figure 4:
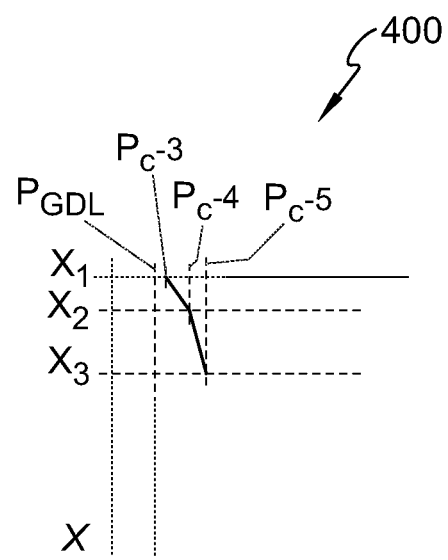
FIG. 4 is a graph illustrating an example implementation of the microporous layer having a gradient capillary pressure in accordance with the present disclosure.

FIG. 4 illustrates an example graph 400 illustrating relative relationship of values of capillary pressure ($P_c$) and position x of the liquid water within the microporous layer 110 and/or the gas diffusion layer 26. In one example, the liquid water may enter the first region 210 of the microporous layer 110 at position $x_1$ in response to capillary pressure ($P_c$) of the liquid water being equal to or greater than the first capillary pressure ($P_{c-3}$). In another example, the liquid water may exit the first region 210 and enter the second region 212 of the microporous layer 110 at position $x_2$ in response to capillary pressure ($P_c$) of the liquid water being equal to or greater than the second capillary pressure ($P_{c-4}$), where the second capillary pressure ($P_{c-4}$) is greater than the first capillary pressure ($P_{c-3}$).

Figure 5:
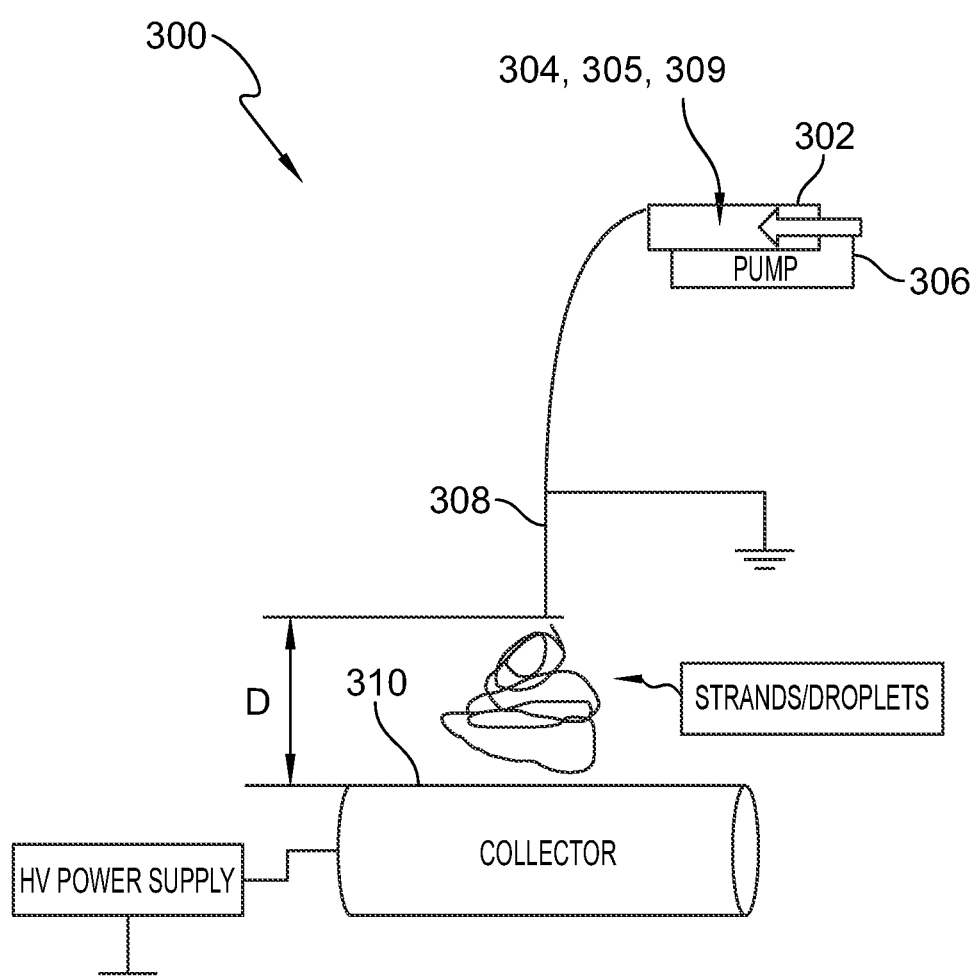
FIG. 5 is a block diagram illustrating an example electrospraying/electrospinning device.

In an example, at least one of the regions 210, 212 may be applied to the gas diffusion layer 26 using an electrospraying process 500-B, as described in reference to at least FIG. 5. As another example, at least one of the regions 210, 212 may be applied to the gas diffusion layer 26 using an electrospinning process 500-A, also described in reference to FIG. 5. As still another example, each of the regions 210, 212 may be applied to the gas diffusion layer 26 using the same or a different one of the electrospraying process 500-B and the electrospinning process 500-A. The microporous layer 112 may be applied to the gas diffusion layer 24 using the same processes.

In one example, the second region 212 of the microporous layer 110 is applied onto the gas diffusion layer 26 using the electrospinning process 500-A and the first region 210 of the microporous layer 110 may be applied onto the gas diffusion layer 26 using the electrospraying process 500-B. In such an example, the first region 210, because it was created via the electrospraying process 500-B, is an isotropic, meaning the capillary pressure ($P_c$) of the first region 210 is the same value in all measurement directions. In such an example, the second region 212, because it was created via the electrospinning process 500-A, is an anisotropic, meaning the capillary pressure ($P_c$) of the second region 210 depends on and therefore changes with a direction of measurement.

FIG. 5 illustrates an example device 300 for electrospraying and/or electrospinning at least one side of the gas diffusion layer 24, 26 with the microporous layer 110, 112 in accordance with the present disclosure. Electrospraying and electrospinning are electrohydrodynamic processes. Electrospraying may be used to generate particles having sizes that are related to the particle size of an electrospraying ink 309 that is used to generate the particles. Typically, electrosprayed particles may range in size (e.g., diameter) from about 100 nanometers to about 1 micron or micrometer, including any specific or range of size comprised therein. In another embodiment, the size of the electrosprayed particles may range from about 100 nanometers to about 10 microns, including any specific or range of size comprised therein.

While it is possible to generate electrosprayed particles that are larger than 10 microns, it is preferable to utilize particle sizes for the present application that are 10 microns or less in size so as to avoid producing an electrosprayed microporous layer 110, 112 with large pores 208 (e.g., greater than 10 micron) and a low capillary pressure. When a microporous layer 110, 112 is produced with large pores 208 and a low capillary pressure, liquid water can easily enter the microporous layer 110, 112 and accumulate, thereby blocking oxygen diffusion. Particle sizes of 10 micron or less, as provided in the present disclosure, enable a higher capillary pressure ($P_c$), as previously described, that promotes oxygen diffusion and avoids the negative effects that occur with large pore 208 sizes.

Electrospinning may be used to generate fibers, comprising strands of polymer, that range in size (e.g., diameter) from about 1 nanometer to about 100 microns, including any specific or range of size comprised therein. In another embodiment, the electrospun fibers may range in diameter from about 1 nanometer to about 100 nanometers, including any specific or range of size comprised therein. In another embodiment, the electrospun fibers may range in diameter from about 100 nanometers to about 1 micron or micrometers, including any specific or range of size comprised therein.

An electrospraying process 500-B differs from an electrospinning process 500-A by a corresponding concentration of a solution or molecular weight of a polymer, as well as inclusion and/or exclusion of solid components used during each of the processes. Unlike electrospraying, electrospinning does not require an inert atmosphere. In some instances, relative humidity equal to or greater than 50% may affect fiber morphology and may prevent fibers from being electrospun.

The example device 300 shown in FIG. 5 includes a reservoir 302 configured to receive a combination substance 304. For the electrospinning process 500-A, the combination substance 304 comprises an electrospinning solution 305 (e.g., a solvent, a polymer, and a solid component), as will be described in more depth below. For the electrospraying process 500-B, the combination substance 304 comprises an electrospraying ink 309 (e.g., a solvent, a binding agent, and a solid material), as will be described in more detail below. The electrospinning solution 305 and the electrospraying ink 309 are electrically conductive, and typically comprise a solvent and a solid (e.g., a solid material).

The example device 300 of FIG. 5 also includes an electric pump 306, such as a syringe pump. The electric pump 306 is configured to push the combination substance 304 from the reservoir 302 through an electrically charged needle 308. The combination substance 304 exits the needle 308 in the shape of a cone, also referred to as a "Taylor Cone."

During electrospraying and electrospinning, the tip of the cone forms a tiny jet that breaks into a fine mist of uniform-sized charged droplets at predefined flow rates. During electrospinning, the tip of the cone forms a tiny jet that is elongated into a high aspect ratio strand of polymer with a length that is about 10 to about 1000 times greater than the diameter of the droplets, including any specific or range of ratio comprised therein. In additional embodiments during electrospinning, the tip of the cone forms a tiny jet that is elongated into a high aspect ratio strand of polymer with a length of about 10 to about 106 times greater than the diameter of the droplets, including any specific or range of ratio comprised therein.

In the electrospraying process 500-B, the deposited droplet size is approximately equal to the size of a particle of the solid material of the electrospraying ink 309. The solvent is driven off the droplets as the electrospraying ink 309 is sprayed, such that the deposited droplets are essentially a particle of the solid material of the electrospraying ink 309 covered by a thin layer of the binding agent of the electrospraying ink 309. In some instances, the solvent of the electrospinning solution 305 or the electrospraying ink 309 used with the example device 300 of FIG. 5 may be configured to control a size of the droplets to range from about 1 nanometer to about 1 micron, including any specific or range of size comprised therein. For example, the size of the droplets may range from about 100 nanometers to about 1 micron, including any specific or range of size comprised therein.

For the electrospraying process 500-B, the jet of device 300 forms the droplets that break into a fine mist from the Taylor Cone and travel toward a collector drum 310. As the droplets travel toward the collector drum 310, the droplets are atomized, creating smaller droplets as solvent is driven off. The droplets explode multiple times because the charge is concentrated as the solvent evaporates. Accordingly, multiple stages of atomization occur to form tiny droplets that contain one particle of the solid material of the electrospraying ink 309 covered by a thin layer of the binding agent of the electrospraying ink 309. The small droplets, often having a spherical shape, may then be deposited on the collector drum 310.

For the electrospinning process 500-A, the jet of device 300 forms a long strand of polymer that breaks away from the Taylor Cone and travels toward the collector drum 310. Interaction between chains of dissolved polymer in the electrospinning solution 305 allows the strand to elongate and remain intact as the solvent of the electrospinning solution 305 is driven off and the strand travels from the Taylor Cone to the collector drum 310, where the high aspect ratio strand of polymer is then deposited to produce the fibers, such as carbon fibers).

Referring back to FIG. 5, while only one needle 308 is shown, in some instances, a plurality of needles 308 may be used to increase a rate of deposition of the droplets and/or the strands of polymer on the collector drum 310. A position of the needle 308 may be adjusted side-to-side, i.e., along an axis of the collector drum 310, and/or up-and-down to increase or decrease a distance D between a tip of the needle 308 and an outer surface of the collector drum 310. Further, while a solid cylindrical collector drum 310 is illustrated, geometry of the collector drum 310 need not be limited thereto. In some examples, the collector drum 310 may be ring-shaped, ball-shaped, spiral coil-shaped, disk-shaped, or some combination thereof.

As one example, applying a microporous layer 110 onto a gas diffusion layer 26 using an electrospraying process 500-B in accordance with the present disclosure typically includes using the combination substance 304, which includes the electrospraying ink 309. An exemplary electrospraying ink 309 of the present disclosure includes a solvent comprising water and alcohol in a one-to-one ratio. In an exemplary embodiment, the alcohol may be isopropyl alcohol or ethanol.

An exemplary electrospraying ink 309 may also include an amount of solid material dispersed in the solvent that ranges from about 2 wt % to about 5 wt %, including any specific or range of percentage comprised therein. In an exemplary embodiment, the solid material in the ink 309 may include, but is not limited to, carbon nanoparticles, amorphous carbon black, cellulose microparticles, Vulcan XC72R carbon powder, and/or monocrystalline cellulose.

The exemplary electrospraying ink 309 may further include at least one binding agent, such as, for example, a polymer or an ionomer. The polymer may be polytetrafluoroethylene (PTFE or Teflon), polystyrene (PS), or combinations thereof. The ionomer may be nafion or a nafion-like substance. An amount of the at least one binding agent in the electrospraying ink 309 may range from about 5 wt % to about 50 wt % of the electrospraying ink 309, including any specific or range of percentage comprised therein. Operating parameters of the electrospraying device 300 may include applying an electrostatic potential in a range from about 5 kV to about 10 kV, including any specific or range of voltage comprised therein.

A gauge of the needle 308 used during the electrospraying process 500-B may be smaller than a gauge of the needle 308 used during the electrospinning process 500-A. In an example, a gauge of the electrospraying needle 308 may be at or about a 22-gauge needle. In another example, the gauge of the electrospraying needle 308 may be at or about a 20-gauge needle. In another example, the gauge of the electrospraying needle 308 may be at or about a 21-gauge needle.

A flowrate of the electrospraying ink 309 through the needle 308 may range from about 0.2 ml/hr to about 0.4 ml/hr flow rate per needle 308, including any specific or range of flowrate comprised therein. In another example, the flowrate of the electrospraying ink 309 through the needle 308 may range from about 0.2 ml/hr to about 0.5 ml/hr per needle 308, including any specific or range of flowrate comprised therein. The distance D between the tip of the needle 308 and the collector drum 310 during the electrospraying process 500-B may range from about 8 centimeters to about 12 centimeters, including any specific or range of distance comprised therein.

As another example, applying a microporous layer 110 onto a gas diffusion layer 26 using an electrospinning process 500-A in accordance with the present disclosure includes using the combination substance 304, which comprises the electrospinning solution 305. An exemplary electrospinning solution 305 may include a polymer and/or a solvent. The polymer may be about 5% wt to about 20% wt of the electrospinning solution 305, including any specific or range of percentage comprised therein. Exemplary polymers of the electrospinning solution 305 may be polyacrylonitrile (PAN), polystyrene, and/or combinations thereof.

The solvent of the electrospinning solution 305 may be dimethylformamide (DMF), dimethyl sulfoxide (DMSO), or combinations thereof. An exemplary solvent for the electrospinning solution 305 is 100% DMF. However, other polymers and/or organic solvents may be comprised by the electrospinning solution 305.

In some embodiments, the electrospinning solution 305 may comprise about 5-20% wt PAN and about 80-95% wt DMF. For example, one embodiment of the electrospinning solution 305 may comprise about 10% wt PAN and about 90% wt DMF. In another embodiment, the electrospinning solution 305 may comprise about 8% wt PAN and about 92% wt DMF.

Solid components may also be included in the electrospinning solution 305 to impart desirable mechanical and electrical properties. The solids may be about 0% wt to about 5% wt of the electrospinning solution 305, including any specific or range of percentage comprised therein. Exemplary solid components or materials of the electrospinning solution 305 include, but are not limited to graphene oxide.

The electrospinning process 500-A of the present disclosure includes the distance D between the needle 308 and the collector drum 310 that ranges from about 5 centimeters to about 30 centimeters, including any specific or range of distance comprised therein. A gauge of the needle 308 used in the electrospinning process 500-A in accordance with the present disclosure may range from about 12-gauge to about 24-gauge, including any specific or range of size comprised therein. The electrospinning process 500-A in accordance with the present disclosure includes applying electrostatic potential ranging from about 5 kV to about 25 kV, including any specific or range of voltage comprised therein. The electrospinning process 500-A of the present disclosure includes applying a flow rate of the electrospinning solution 305 through one or more needles 308 that ranges from about 0.3 ml/hr to about 0.8 ml/hr, including any specific or range of flowrate comprised therein.

With reference to FIGS. 2A and 5, controlling (e.g., altering, changing, and/or adjusting) one or more parameters of the electrospraying device and/or the electrospinning device (such as, for example, the device 300) may cause one or more physical and/or chemical properties of the resulting microporous layer 110 to change. For example, typically the size of pores 208 in the electrosprayed microporous layer 110 may range from about 10 nanometers to about 1 micron, including any specific size or range of size comprised therein. The pores may also be even greater than 1 micron. A value of porosity of the electrosprayed microporous layer 110 may be up to about 80%, such as ranging from about 10% to about 80%, including any specific or range of percentage comprised therein.

In some instances, porosity and pore 208 size of the electrosprayed microporous layer 110 may be controlled or changed by controlling a composition of the electrospraying ink 309. In an example, changing a diameter of solid particles (e.g., such as particles comprised of Vulcan XC72R carbon powder) in the electrospraying ink 309 may cause a size of pores 208 of the microporous layer 110 to change. For instance, increasing diameters of solid particles in the electrospraying ink 309 may cause sizes of the pores 208, and, thus, a value of porosity, to increase. As another example, decreasing a diameter of solid particles in the electrospraying ink 309 may cause sizes of the pores 208, and, thus, a value of porosity, to decrease.

In some instances, porosity and pore 208 size of the electrosprayed microporous layer 110 may also be controlled by controlling a concentration of the binding agent in the electrospraying ink 309. For example, increasing the concentration of the binding agent in the electrospraying ink 309 may cause sizes of the pores 208 and a value of porosity of the microporous layer 110 to decrease. As another example, decreasing the concentration of the binding agent in the electrospraying ink 309 may cause sizes of the pores 208 and a value of porosity of the microporous layer 110 to increase.

Electrospinning process 500-A may be used to create fiber matrices with pore 208 sizes ranging from about 500 nanometers to about 1 micron, including any specific or range of size comprised therein. Electrospinning process 500-A may also cause pores 208 to have porosities as high as about 90%, such as from about 10% to about 90%, including any specific or range of percentage comprised therein. In some instances, a diameter of electrospun strands of polymer and/or fibers may be controlled by controlling the distance D between the needle 308 and the collector drum 310. For example, a diameter of the electrospun strands of polymer and/or fibers may decrease in response to an increase in the distance D between the needle 308 and the collector drum 310. As another example, a diameter of the electrospun strands of polymer and/or fibers may increase in response to a decrease in the distance D between the needle 308 and the collector drum 310.

In other instances, a diameter of electrospun strands of polymer and/or fibers may be controlled by controlling an applied voltage of the electrospinning device 300. For example, a diameter of the electrospun strands of polymer and/or fibers may decrease in response to an increase in the applied voltage. As another example, a diameter of the electrospun strands of polymer and/or fibers may increase in response to a decrease in the applied voltage of the electrospinning device 300.

In still other instances, a diameter of electrospun strands of polymer and/or fibers may be controlled by controlling a composition of the electrospinning solution 305. For example, decreasing a concentration of polymer in the electrospinning solution 305 may cause a diameter of the electrospun strands of polymer and/or fibers to decrease. As another example, increasing the concentration of polymer in the electrospinning solution 305 may cause a diameter of the electrospun strands of polymer and/or fibers to increase.

Applying capillary pressure gradients in the microporous layer 110 and the gas diffusion layer 26 of a given fuel cell 20, in accordance with the present disclosure, may improve a transient response of that fuel cell 20 to a change in operating conditions. A capillary pressure of a hydrophobic layer (or hydrophobic region of a layer) may range from about 1 kPa to about 1000 kPa, including any specific or range of pressure comprised therein. A capillary pressure of a hydrophilic layer (or hydrophilic region of a layer) may range from about negative (−) 1 kPa to about negative (−) 100 kPa, including any specific or range of pressure comprised therein. In particular, pore 208 size gradients in the microporous layer 110 may favorably affect controlling water accumulation in the membrane electrode assembly 22 and/or controlling water accumulation in the oxidant flow fields 42 at the cathode 30 side and fuel flow fields 44 at the anode 28 side.

Figure 6A:
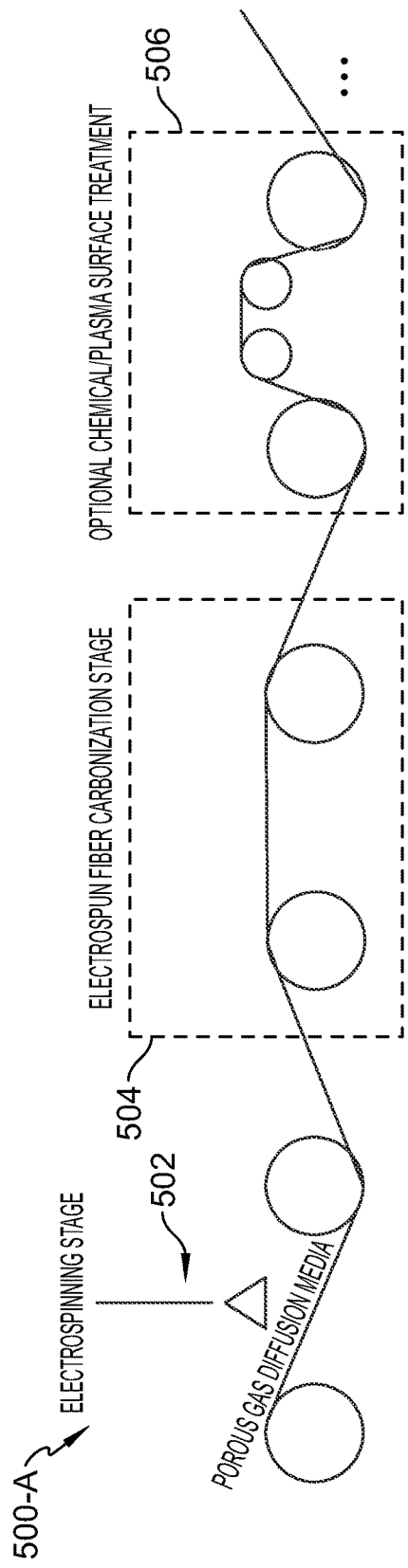
FIG. 6A is a block diagram illustrating an example of manufacturing stages for applying the microporous layer onto the gas diffusion layer in accordance with the present disclosure.

FIG. 6A illustrates an example process 500-A of applying at least a portion of the microporous layer 110 onto the gas diffusion layer 26 using electrospinning in accordance with the present disclosure. One or more stages of the process 500-A may be performed using the electrospinning device 300, as described in reference to at least FIG. 5. In an example, one or more stages of the process 500-A may include using the electrospinning solution 305, as described above.

The electrospinning process 500-A includes applying, at stage 502, electrospun strands of polymer to generate the microporous layer 110 made up of carbon fibers configured to transport water away from the membrane 104. The process 500-A also includes providing pores 208 for reactant gases to diffuse through, and to reach the catalyst layer (such as, the catalyst layer 106 described in reference to FIG. 3). The process 500-A may further include using a polymer, such as polyacrylonitrile (PAN), and a solvent, such as dimethylformamide (DMF).

During stage 502, a high voltage power supply is used to create an electrostatic potential difference between the electrospinning solution 305 in the needle 308 and the collector drum 310. The electrostatic potential difference draws the solution 305 from the needle 308 to the collector drum 310. The needle 308 may be charged while the collector drum 310 is electrically grounded, or vice versa. A thickness of the electrospun strands of polymer and/or fibers is controlled by the amount of strands of polymer deposited on the collector drum 310.

The process 500-A may also include generating at least one layer of carbon fibers having a high purity, e.g., carbon fibers having a purity greater than about 90%. To that end, the process 500-A may include performing, at stage 504, carbonization, during which solvents still present following electrospinning may be driven off, or otherwise removed from a surface of the coated gas diffusion layer 26. Accordingly, the process 500-A of the present disclosure may include using carbonization to remove solvents, instead of, for example, removing solvents using a vacuum chamber.

To perform the carbonization in stage 504, the electrospun fibers are heated in the presence of oxygen to about 200° C. to about 300° C., including any specific or range of temperature comprised therein. The electrospun fibers are held at a constant temperature for about 150 minutes. The temperature is then increased to about 800° C. to about 2000° C., including any specific or range of temperature comprised therein, and the atmosphere around the electrospun fibers is purged of oxygen. The electrospun fibers are held at this temperature for about 30 to about 90 minutes, including any specific or range of time comprised therein, yielding carbon fibers having a high purity.

The process 500-A may optionally include, at stage 506, applying a chemical and/or a plasma treatment to the surface of a region of the microporous layer 110, such that the chemical and/or the plasma treatment is applied to the electrospun fibers that were deposited on the gas diffusion layer 26 in stage 502 and subsequently carbonized in stage 504. The surface of the region of the microporous layer 110 is hydrophobized in stage 506. The chemical and/or the plasma treatment may include chemical techniques, such as an attachment of one or more pentafluoro groups and/or plasma treatments in the presence of fluorocarbons. The chemical treatment may also include the application of a photoresist or one or more metal particles. The plasma treatment may include a surface modification of fibers via tetrafluoromethane. In some instances, a region of the microporous layer 110 resulting from operations of stages 502 and/or 504 may be the second region 212 of the microporous layer 110, as described in reference to FIG. 3.

Figure 6B:
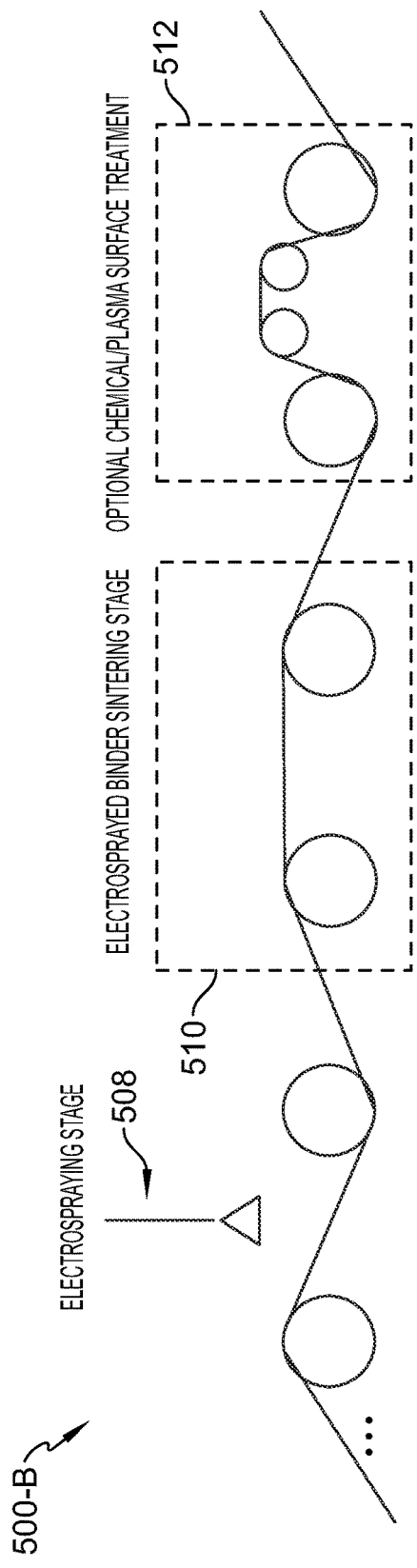
FIG. 6B is a block diagram illustrating an example of manufacturing stages for applying the microporous layer onto the gas diffusion layer in accordance with the present disclosure.

FIG. 6B illustrates an example process 500-B of applying at least a portion of the microporous layer 110 onto the gas diffusion layer 26 using electrospraying in accordance with the present disclosure. One or more stages of the electrospraying process 500-B may be performed using the electrospraying device 300, as described in reference to at least FIG. 5. In an example, one or more stages of the process 500-B may include using the electrospraying ink 309, as described above.

While processes of electrospinning 500-A and electrospraying 500-B are described separately, in some instances, one or more operations of the process 500-B may follow one or more operations of the process 500-A. In another example, one or more operations of the process 500-B may precede one or more operations of the process 500-A. Accordingly, a process for applying a microporous layer 110 onto the gas diffusion layer 26 in accordance with the present disclosure may include combining both the electrospraying and electrospinning processes 500-B, 500-A.

The electrospraying process 500-B includes applying, at stage 508, the electrospraying ink 309 to generate at least a portion of the microporous layer 110 configured to transport water away from the membrane 104 while providing pores 208 for reactant gases to diffuse through, reaching the catalyst layer (such as, the catalyst layer 106 described in reference to FIG. 3). The process 500-B may include performing, at stage 510, sintering, during which the binding material is cured onto at least a portion of the gas diffusion layer 26. During sintering, a polymer used in the electrospraying ink 309 is heated above its glass transition temperature such that polymer on the surface of solid particles flows and fuses together. During sintering of stage 510, the temperature may be held for about 15 to about 30 minutes, including any specific or range of time comprised therein.

The process 500-B may optionally include, at stage 512, applying a chemical and/or a plasma treatment to the surface of a region of the microporous layer 110, such that the chemical and/or the plasma treatment is applied to the portion of the microporous layer 110 that was electrosprayed onto the gas diffusion layer 26 in stage 508 and subsequently sintered in stage 510. The chemical and/or the plasma treatment may include chemical techniques such as an attachment of pentafluoro groups and/or plasma treatments in the presence of fluorocarbons. The chemical treatment may also include the application of photoresist or one or more metal particles. The plasma treatment may further include a surface modification of fibers via tetrafluoromethane. In some instances, a region of the microporous layer 110 resulting from operations of stages 508 and/or 510 and 512 may be the first region 210 of the microporous layer 110, as described in reference to FIG. 3.

In this manner, instead of, for example, generating fiber-reinforced proton conducting membranes 104, the processes 500-A and 500-B of the present disclosure generate porous media, e.g., layers of electrospun/electrosprayed fibers and/or particles that comprise the microporous layer 110, with improved liquid water and gas transport capabilities that also have no catalytic activity. The processes 500-A and 500-B include incorporating the fibers and/or particles that comprise the microporous layer 110 into the gas diffusion layer 26, which is adjacent to, but not a part of, the catalyst layer 106. Thus, the processes 500-A and 500-B promote improved reactant delivery to the catalyst layer 106.

In particular, the processes 500-A and 500-B described above generate the microporous layer 110 having distinct regions (e.g. the first region 210 and the second region 212) with different pore 208 sizes. In some instances, the microporous layer 110 may be produced by additive application of the combination substance 304 to the collector drum 310 using described electrospraying and electrospinning processes 500-B, 500-A, meaning the processes 500-B, 500-A are repeated to generate multiple layers of fibers and/or particles.

A thicknesses of the resulting microporous layer 110 may range from about 0.5 microns to about 40 microns, including any specific or range of thickness comprised therein. In other embodiments, the thickness of the microporous layer 110 may be greater than 40 microns. In other embodiments, the thickness of the microporous layer 110 may be less than 40 microns. In some embodiments, the thickness of the resulting microporous layer 110 may range from about 40 microns to about 100 microns, including any specific or range of thickness comprised therein. In this manner, using the gas diffusion layer 26 with the microporous layer 110 having a gradient capillary pressure permits refined control of retention of water within and/or removal of water away from the catalyst layer 106 to improve flooding tolerance and, thus, overall operation, of the fuel cell 20.

The following described aspects of the present invention are contemplated and non-limiting:

A first aspect of the present invention relates to a system for a fuel cell. The fuel cell comprises a catalyst layer and a microporous layer. The catalyst layer is configured to generate liquid water in response to a reactant being in contact therewith. The microporous layer includes a first region having a first pore size and a second region disposed adjacent to the first region and having a second pore size. The first pore size is greater than the second pore size. The microporous layer is configured to transfer the liquid water away from the catalyst layer, such that the liquid water from the catalyst layer enters the first region of the microporous layer in response to a capillary pressure of the liquid water being greater than a first capillary pressure of the first region of the microporous layer, and the liquid water enters the second region of the microporous layer in response to a capillary pressure of the liquid water being greater than a second capillary pressure of the second region of the microporous layer. The first capillary pressure is different from the second capillary pressure.

A second aspect of the present invention relates to a method for manufacturing a fuel cell. The method comprises applying, using electrospinning, at least a portion of a microporous layer of the fuel cell onto a gas diffusion layer of the fuel cell to create electrospun fibers; and applying, using electrospraying, at least a portion of the microporous layer onto the gas diffusion layer, such that the resulting microporous layer includes a gradient capillary pressure including a plurality of capillary pressures that is configured to transfer liquid water away from a catalyst layer of the fuel cell toward the gas diffusion layer using the plurality of capillary pressures, wherein the liquid water from the catalyst layer enters the microporous layer in response to capillary pressure of the liquid water being greater than a first capillary pressure of the plurality of capillary pressures of the microporous layer, and the liquid water continues to be absorbed deeper into the microporous layer in response to capillary pressure of the liquid water being greater than a second capillary pressure of the plurality of capillary pressures of the microporous layer, wherein the second capillary pressure is greater than the first capillary pressure.

A third aspect of the present invention relates to a fuel cell. The fuel cell comprises a catalyst layer, a gas diffusion layer, and a microporous layer. The catalyst layer is configured to generate liquid water in response to a reactant being in contact with the catalyst layer. The gas diffusion layer is configured to receive the liquid water from the catalyst layer. The microporous layer is disposed between the catalyst layer and the gas diffusion layer. The microporous layer is configured to transfer the liquid water away from the catalyst layer and toward the gas diffusion layer. The microporous layer comprises a gradient capillary pressure including a plurality of capillary pressures. The microporous layer is configured to transfer the liquid water using the plurality of capillary pressures such that the liquid water from the catalyst layer enters the microporous layer in response to a capillary pressure of the liquid water being greater than a first capillary pressure of the plurality of capillary pressures of the microporous layer, and the liquid water is configured to be absorbed by the microporous layer in response to the capillary pressure of the liquid water being greater than a second capillary pressure of the plurality of capillary pressures of the microporous layer. The first capillary pressure of the plurality of capillary pressures is less than the second capillary pressure of the plurality of capillary pressures.

In the first aspect of the present invention, the second capillary pressure may be greater than the first capillary pressure, and the second region may be configured to slow transfer of liquid water away from the catalyst layer. In the first aspect of the present invention, the fuel cell may further comprise a gas diffusion layer, wherein the first region and the second region of the microporous layer may be coated onto and integrated with a surface of the gas diffusion layer.

In the first aspect of the present invention, at least one of the first region and the second region of the microporous layer may be coated onto the gas diffusion layer using an electrospinning process. In the first aspect of the present invention, an electrospinning solution of the electrospinning process may be comprised of a solvent comprising about 90 wt % dimethylformamide (DMF) and a polymer comprising about 10 wt % polyacrylonitrile (PAN).

In the first aspect of the present invention, at least one of the first region and the second region of the microporous layer may be coated onto the gas diffusion layer using an electrospraying process. In the first aspect of the present invention, an electrospraying solution of the electrospraying process may comprise a solvent comprising water and alcohol in a one-to-one ratio, a solid material that ranges from about 2 wt % to about 5 wt %, or a binding agent that ranges from about 5 wt % to about 50 wt % of the solid material.

In the first aspect of the present invention, the binding agent may comprise one of a polymer or an ionomer. In the first aspect of the present invention, at least one of the first region and the second region may be coated onto the gas diffusion layer by an electrospraying device, wherein the electrospraying device may include a pump and at least one needle, and wherein the pump may flow the electrospraying solution through the at least one needle at a flow rate ranging from about 0.2 ml/hr to about 0.4 ml/hr.

In the first aspect of the present invention, the liquid water may exit the microporous layer and enter the gas diffusion layer in response to a capillary pressure of the liquid water being greater than a third capillary pressure, wherein the third capillary pressure may be greater than the second capillary pressure. In the first aspect of the present invention, a thickness of the microporous layer may be about 0.5 microns to about 40 microns.

In the second aspect of the present invention, the method may further comprise carbonizing the electrospun fibers applied to the gas diffusion layer to remove solvents from the gas diffusion layer, wherein the carbonizing may include heating the electrospun fibers for a predefined period of time. In the second aspect of the present invention, the method may further comprise sintering a binding agent applied to the gas diffusion layer during the electrospraying. In the second aspect of the present invention, the binding agent may comprise one of a polymer or an ionomer.

In the third aspect of the present invention, the liquid water may be configured to exit the microporous layer and to enter the gas diffusion layer in response to the capillary pressure of the liquid water being greater than a third capillary pressure of the gas diffusion layer, wherein the second capillary pressure may be less than the third capillary pressure. In the third aspect of the present invention, the microporous layer may comprise at least two regions, and wherein each of the at least two regions may have a corresponding capillary pressure of the plurality of capillary pressures that is different from a capillary pressure of the other region of the at least two regions.

In the third aspect of the present invention, the liquid water may be configured to enter a first region of the microporous layer in response to the capillary pressure of the liquid water being greater than the first capillary pressure of the first region, wherein the liquid water may be configured to enter a second region of the microporous layer in response to the capillary pressure of the liquid water being greater than the second capillary pressure of the second region, and wherein the liquid water may be configured to exit the microporous layer and to enter the gas diffusion layer in response to the capillary pressure of the liquid water being greater than the third capillary pressure of the gas diffusion layer.

The features illustrated or described in connection with one exemplary embodiment may be combined with any other feature or element of any other embodiment described herein. Such modifications and variations are intended to be included within the scope of the present disclosure. Further, a person skilled in the art will recognize that terms commonly known to those skilled in the art may be used interchangeably herein.

The above embodiments are described in sufficient detail to enable those skilled in the art to practice what is claimed and it is to be understood that logical, mechanical, and electrical changes may be made without departing from the spirit and scope of the claims. The detailed description is, therefore, not to be taken in a limiting sense.

As used herein, an element or step recited in the singular and proceeded with the word "a" or "an" should be understood as not excluding plural of said elements or steps, unless such exclusion is explicitly stated. Furthermore, references to "one embodiment" of the presently described subject matter are not intended to be interpreted as excluding the existence of additional embodiments that also incorporate the recited features. Specified numerical ranges of units, measurements, and/or values comprise, consist essentially or, or consist of all the numerical values, units, measurements, and/or ranges including or within those ranges and/or endpoints, whether those numerical values, units, measurements, and/or ranges are explicitly specified in the present disclosure or not.

Unless defined otherwise, technical and scientific terms used herein have the same meaning as is commonly understood by one of ordinary skill in the art to which this disclosure belongs. The terms "first," "second," "third" and the like, as used herein do not denote any order or importance, but rather are used to distinguish one element from another. The term "or" is meant to be inclusive and mean either or all of the listed items. In addition, the terms "connected" and "coupled" are not restricted to physical or mechanical connections or couplings, and can include electrical connections or couplings, whether direct or indirect.

Moreover, unless explicitly stated to the contrary, embodiments "comprising," "including," or "having" an element or a plurality of elements having a particular property may include additional such elements not having that property. The term "comprising" or "comprises" refers to a composition, compound, formulation, or method that is inclusive and does not exclude additional elements, components, and/or method steps. The term "comprising" also refers to a composition, compound, formulation, or method embodiment of the present disclosure that is inclusive and does not exclude additional elements, components, or method steps.

The phrase "consisting of" or "consists of" refers to a compound, composition, formulation, or method that excludes the presence of any additional elements, components, or method steps. The term "consisting of" also refers to a compound, composition, formulation, or method of the present disclosure that excludes the presence of any additional elements, components, or method steps.

The phrase "consisting essentially of" or "consists essentially of" refers to a composition, compound, formulation, or method that is inclusive of additional elements, components, or method steps that do not materially affect the characteristic(s) of the composition, compound, formulation, or method. The phrase "consisting essentially of" also refers to a composition, compound, formulation, or method of the present disclosure that is inclusive of additional elements, components, or method steps that do not materially affect the characteristic(s) of the composition, compound, formulation, or method steps.

Approximating language, as used herein throughout the specification and claims, may be applied to modify any quantitative representation that could permissibly vary without resulting in a change in the basic function to which it is related. Accordingly, a value modified by a term or terms, such as "about," and "substantially" is not to be limited to the precise value specified. In some instances, the approximating language may correspond to the precision of an instrument for measuring the value. Here and throughout the specification and claims, range limitations may be combined and/or interchanged. Such ranges are identified and include all the sub-ranges contained therein unless context or language indicates otherwise.

As used herein, the terms "may" and "may be" indicate a possibility of an occurrence within a set of circumstances; a possession of a specified property, characteristic or function; and/or qualify another verb by expressing one or more of an ability, capability, or possibility associated with the qualified verb. Accordingly, usage of "may" and "may be" indicates that a modified term is apparently appropriate, capable, or suitable for an indicated capacity, function, or usage, while taking into account that in some circumstances, the modified term may sometimes not be appropriate, capable, or suitable.

It is to be understood that the above description is intended to be illustrative, and not restrictive. For example, the above-described embodiments (and/or aspects thereof) may be used individually, together, or in combination with each other. In addition, many modifications may be made to adapt a particular situation or material to the teachings of the subject matter set forth herein without departing from its scope. While the dimensions and types of materials described herein are intended to define the parameters of the disclosed subject matter, they are by no means limiting and are exemplary embodiments. Many other embodiments will be apparent to those of skill in the art upon reviewing the above description. The scope of the subject matter described herein should, therefore, be determined with reference to the appended claims, along with the full scope of equivalents to which such claims are entitled.

This written description uses examples to disclose several embodiments of the subject matter set forth herein, including the best mode, and also to enable a person of ordinary skill in the art to practice the embodiments of disclosed subject matter, including making and using the devices or systems and performing the methods. The patentable scope of the subject matter described herein is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A fuel cell comprising:
    a catalyst layer configured to generate liquid water in response to a reactant being in contact therewith; and
    a microporous layer including a first region having a first pore size and a second region disposed adjacent to the first region and having a second pore size, wherein the first pore size is greater than the second pore size and the first region is disposed adjacent the catalyst layer to locate the first region between the catalyst layer and the second region, and
        wherein the microporous layer is configured to transfer the liquid water away from the catalyst layer, such that the liquid water from the catalyst layer enters the first region of the microporous layer in response to a capillary pressure of the liquid water being greater than a first capillary pressure of the first region of the microporous layer,
        wherein the liquid water enters the second region of the microporous layer in response to a capillary pressure of the liquid water being greater than a second capillary pressure of the second region of the microporous layer, and
        wherein the first capillary pressure is different from the second capillary pressure.

2. The fuel cell of claim 1, wherein the second capillary pressure is greater than the first capillary pressure, and wherein the second region is configured to slow transfer of the liquid water away from the catalyst layer.

3. The fuel cell of claim 1, further comprising a gas diffusion layer, wherein the first region and the second region of the microporous layer are coated onto and integrated with a surface of the gas diffusion layer.

4. The fuel cell of claim 3, wherein at least one of the first region and the second region of the microporous layer is coated onto the gas diffusion layer using an electrospinning process.

5. The fuel cell of claim 4, wherein an electrospinning solution of the electrospinning process is comprised of a solvent comprising about 90 wt % dimethylformamide (DMF) and a polymer comprising about 10 wt % polyacrylonitrile (PAN).

6. The fuel cell of claim 3, wherein at least one of the first region and the second region of the microporous layer is coated onto the gas diffusion layer using an electrospraying process.

7. The fuel cell of claim 6, wherein an electrospraying solution of the electrospraying process comprises a solvent comprising water and alcohol in a one-to-one ratio, a solid material that ranges from about 2 wt % to about 5 wt %, or a binding agent that ranges from about 5 wt % to about 50 wt % of the solid material.

8. The fuel cell of claim 7, wherein the binding agent comprises a polymer or an ionomer.

9. The fuel cell of claim 7, wherein at least one of the first region and the second region is coated onto the gas diffusion layer by an electrospraying device, wherein the electrospraying device includes a pump and at least one needle, and wherein the pump flows the electrospraying solution through the at least one needle at a flow rate ranging from about 0.2 ml/hr to about 0.4 ml/hr.

10. The fuel cell of claim 3, wherein the liquid water exits the second region of the microporous layer and enters the gas diffusion layer in response to a capillary pressure of the liquid water being greater than a third capillary pressure, and wherein the third capillary pressure is greater than the second capillary pressure.

11. The fuel cell of claim 1, wherein a thickness of the microporous layer is about 0.5 microns to about 40 microns.

12. A method for manufacturing a fuel cell, the method comprising:
    applying, using electrospinning, at least a portion of a microporous layer of the fuel cell onto a gas diffusion layer of the fuel cell to create electrospun fibers; and
    applying, using electrospraying, at least a portion of the microporous layer onto the gas diffusion layer, such that the resulting microporous layer includes a gradient capillary pressure including a plurality of capillary pressures that is configured to transfer liquid water away from a catalyst layer of the fuel cell toward the gas diffusion layer using the plurality of capillary pressures,
        wherein the liquid water from the catalyst layer enters the microporous layer in response to a capillary pressure of the liquid water being greater than a first capillary pressure of the plurality of capillary pressures of the microporous layer,
        wherein the liquid water continues to be absorbed deeper into the microporous layer in response to the capillary pressure of the liquid water being greater than a second capillary pressure of the plurality of capillary pressures of the microporous layer, and
        wherein the second capillary pressure is greater than the first capillary pressure.

13. The method of claim 12, further comprising carbonizing the electrospun fibers applied to the gas diffusion layer to remove solvents from the gas diffusion layer, wherein the carbonizing includes heating the electrospun fibers for a predefined period of time.

14. The method of claim 12, further comprising sintering a binding agent applied to the gas diffusion layer during the electrospraying.

15. The method of claim 14, wherein the binding agent comprises a polymer or an ionomer.

16. A fuel cell comprising:
a catalyst layer configured to generate liquid water in response to a reactant being in contact with the catalyst layer;
a gas diffusion layer configured to receive the liquid water from the catalyst layer; and
a microporous layer disposed between the catalyst layer and the gas diffusion layer and configured to transfer the liquid water away from the catalyst layer and toward the gas diffusion layer,
wherein the microporous layer comprises a gradient capillary pressure including a plurality of capillary pressures,
wherein the microporous layer is configured to transfer the liquid water using the plurality of capillary pressures such that the liquid water from the catalyst layer enters the microporous layer in response to a capillary pressure of the liquid water being greater than a first capillary pressure of the plurality of capillary pressures of the microporous layer, and
wherein the liquid water is configured to be absorbed by the microporous layer in response to the capillary pressure of the liquid water being greater than a second capillary pressure of the plurality of capillary pressures of the microporous layer, wherein the first capillary pressure of the plurality of capillary pressures is less than the second capillary pressure of the plurality of capillary pressures.

17. The fuel cell of claim 16, wherein the liquid water is configured to exit the microporous layer and to enter the gas diffusion layer in response to the capillary pressure of the liquid water being greater than a third capillary pressure of the gas diffusion layer, wherein the second capillary pressure is less than the third capillary pressure.

18. The fuel cell of claim 17, wherein the microporous layer comprises at least two regions, and wherein each of the at least two regions has a corresponding capillary pressure of the plurality of capillary pressures that is different from a capillary pressure of the other region of the at least two regions.

19. The fuel cell of claim 18, wherein the liquid water is configured to enter a first region of the microporous layer in response to the capillary pressure of the liquid water being greater than the first capillary pressure of the first region, wherein the liquid water is configured to enter a second region of the microporous layer in response to the capillary pressure of the liquid water being greater than the second capillary pressure of the second region, and wherein the liquid water is configured to exit the microporous layer and to enter the gas diffusion layer in response to the capillary pressure of the liquid water being greater than the third capillary pressure of the gas diffusion layer.

20. The fuel cell of claim 19, wherein a first pore size of the first region of the microporous layer is greater than a second pore size of the second region of the microporous layer.

* * * * *